CONTROL APPARATUS FOR AIRCRAFT

Original Filed Aug. 18, 1958 6 Sheets-Sheet 1

INVENTOR.
ANDERS L. LJUNGWE
ROBERT C.K. LEE

BY Gordon Reed
ATTORNEY

CONTROL APPARATUS FOR AIRCRAFT

Original Filed Aug. 18, 1958 6 Sheets-Sheet 2

INVENTOR.
ANDERS L. LJUNGWE
ROBERT C. K. LEE
BY
Gordon Reed
ATTORNEY

CONTROL APPARATUS FOR AIRCRAFT

Original Filed Aug. 18, 1958 6 Sheets-Sheet 3

INVENTOR.
ANDERS L. LJUNGE
ROBERT C.K. LEE
BY
Gordon Reed
ATTORNEY

INVENTOR.
ANDERS L. LJUNGWE
ROBERT C. K. LEE
BY
Gordon Reed
ATTORNEY

INVENTOR.
ANDERS L. LJUNGWE
ROBERT C. K. LEE
BY
Gordon O. Reed
ATTORNEY $L = L_1$, if $E_i < H$ $L = L_1 + (L_1 - L_2)\, e^{-\frac{t}{T_1}}$ if $E_i \leq H$ t = time elapsed since last time $E_i = H$ INVENTOR.
ANDERS L. LJUNGWE
ROBERT C. K. LEE
BY
Gordon Reed
ATTORNEY United States Patent Office Re. 25,491
Reissued Dec. 3, 1963

25,491

CONTROL APPARATUS FOR AIRCRAFT

Robert C. K. Lee, Arlington, Mass., and Anders L. Ljungwe, Marion, Iowa, assignors to Minneapolis-Honeywell Regulator Company, Minneapolis, Minn., a corporation of Delaware Original No. 3,030,054, dated Apr. 17, 1962, Ser. No. 755,574, Aug. 18, 1958. Application for reissue Mar. 25, 1963, Ser. No. 268,857
54 Claims. (Cl. 244—77)

Matter enclosed in heavy brackets [ ] appears in the original patent but forms no part of this reissue specification; matter printed in italics indicates the additions made by reissue.

This invention relates to control apparatus and more particularly to self adaptive multimode control systems of the dynamically invariant type.

The adaptive control system was developed to include a novel innerloop which serves to reduce the instantaneous error of the system output as rapidly as possible. To accomplish this error reduction, a high loop gain system is generally required and this is achieved herein by a nonlinear controller. In effect a characteristic of the adaptive control system herein is to be able to control the control system such that the overall response of the control system will be constant or dynamically invariant independent of variation in the parameters of the controlled system.

The multimode adaptive control system of the subject invention has been applied in one embodiment to the control of an aircraft about its pitch axis. Ideally an adaptive control system of this type is able to adapt itself to all environmental conditions of the aircraft and to any human control stimulus in order to realize optimum overall performance under all conditions and the system herein approaches such ideal by providing a selective dynamic invariant system.

In general, the mathematical expression defining the response characteristics of an autopilot-airplane combination is influenced by changes in flight conditions for instance: change in Mach, altitude, craft configuration etc., by nonlinear effects which cause the system response to vary with a primary input signal, and by interaction effects which cause the response of one control loop to be affected by signals in other control loops. An ideal auto pilot for an aircraft would be able to adapt to all of these effects occurring simultaneously and to maintain an optimum or dynamically invariant response at all times.

The response characteristics of an aircraft as stated are influenced by changes in flight condition such as changes in altitude or changes in air speed, craft configuration, load disposition or other factors. In the past, scheduling devices such as impact pressure or altitude responsive gain changing devices have been provided to compensate control signals of the automatic pilot for such changes in flight condition in order to maintain an optimum response of the control system at all times. However, despite such forms of compensation for changes in flight control condition, which are in the nature of open loop calibrated compensations, the ideal autopilot control of an aircraft is not readily achieved.

A significant step toward achieving the ideal autopilot is taken in the present invention by disregarding such calibrated compensation effects, through air speed or altitude sensing devices which altered the system gains or other factors, but rather concentrating on the actual effects of the varying flight conditions on craft performance and achieving a response which is an optimum for the particular operating condition.

The approach taken regarding such actual effects in the subject invention which in a sense may be said to compute its own transfer function is by sensing the error from input and output signal data to obtain an error signal. The appropriate control system parameters are then varied in accordance with this error to achieve the desired response.

The control utilized in the invention is based on the idea of adaptive multimode operations, and it involves a discontinuous nonlinear control for comparatively large error signals but continuous control for small error signals. The choice of the operation is governed by a function of the error signal and its derivative or derivatives thereof.

A servo system such as an autopilot-aircraft combination may have its operation expressed in a response equation showing the relationship between input and output. The response equation may be expressed in a displacement term and various derivatives thereof and the displacement and derivative terms may also have coefficients. The present system is so designed, that changes in the coefficients in the response equation of the variables of parameters of the controlled system, i.e. aircraft, do not influence the overall performance. The influence from the controller of the present system on the coefficients of the system transfer function is much larger than that from the controlled system. Cancellation of the dynamics of the controlled system which in an airplane-autopilot combination are due to changes in air speed and altitude and other factors, are achieved herein preferably by nonlinear rather than linear means. By discontinuous compensations, the capability to respond in a desired way independent of variations in the controlled system is achieved.

When the controller is of the high gain discontinuous type such as that provided by a relay having the output characteristics of supplying but two magnitudes of servo control, i.e. one tending to reduce an error of one polarity and the second to reduce the error of the opposite polarity, hunting of the system about the zero error of the condition will occur. This hunting arises because of the high gain at the relay for small errors near zero condition.

An object therefore of this invention is to provide a novel method of eliminating or reducing the effects of the variation of aircraft parameters by means of a self-evaluating control system wherein the aircraft response is continually evaluated and the control system automatically adjusts the control compensation to hold the overall system performance invariant, or, more generally, adjusts the compensation to give optimum performance.

A further object of this invention is to provide a novel multimode adaptive control system for controlling the attitude rate of an aircraft comprising a model and a non-linear compensator or controller and wherein the model represents the desired output, in this instance desired attitude rate, and the sole function of the compensator is to minimize the error between the output of the system which includes the aircraft being controlled and the output of the model wherein the system output is craft attitude rate.

A further object of this invention is to provide a multimode adaptive control system utilizing a controller which for comparatively large error signals operates a servo in one direction at a maximum rate to correct for error functions of one polarity but operates the servo at a minimum rate in the reverse direction for comparatively large errors of the opposite polarity. However, for small error signals at a magnitude between said large signals, the controller operates said servo in such regions at a rate variable in accordance with the magnitude of the small error signal.

A further object of this invention is to provide an adjustable limit for the maximum rate of operation of said servo for large error signals, when said servo operation is beyond the variable rate region.

A further object of this invention is to provide an adaptive system for controlling an aircraft to selected attitude rate with novel means for damping the hunting of the craft attitude rate about any selected attitude rate.

A further object of this invention is to provide an adaptive automatic control system for a dirigible craft wherein variations or hunting of craft attitude rate from a selected attitude rate is reduced by varying the operation rate of craft attitude rate changing means in accordance with said variations, to compensate for wide changes in aircraft parameters.

The above and other objects of the invention as well as other advantages and features incidental thereto may be had from a consideration of the following description in conjunction with the accompanying drawings wherein.

Figure 2:
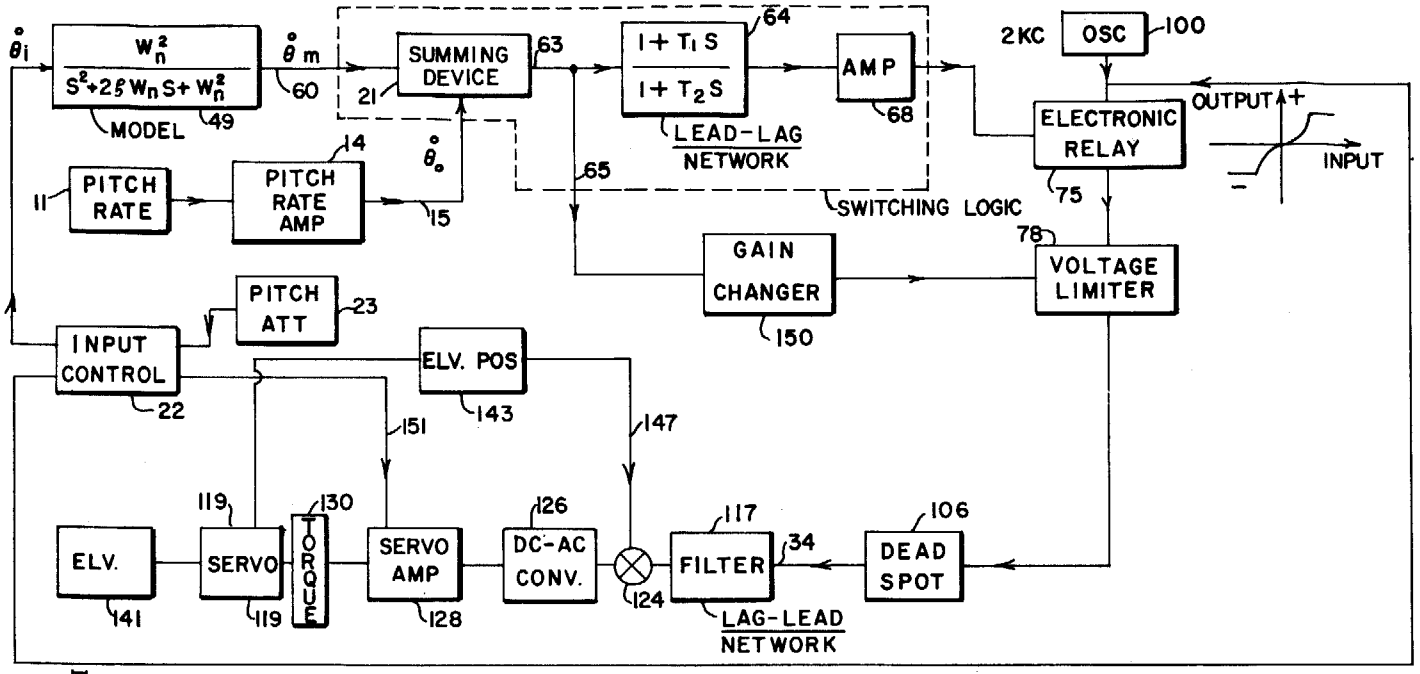
FIGURE 2 is a block diagram of the invention applied to an autopilot system.
Figure 3A:
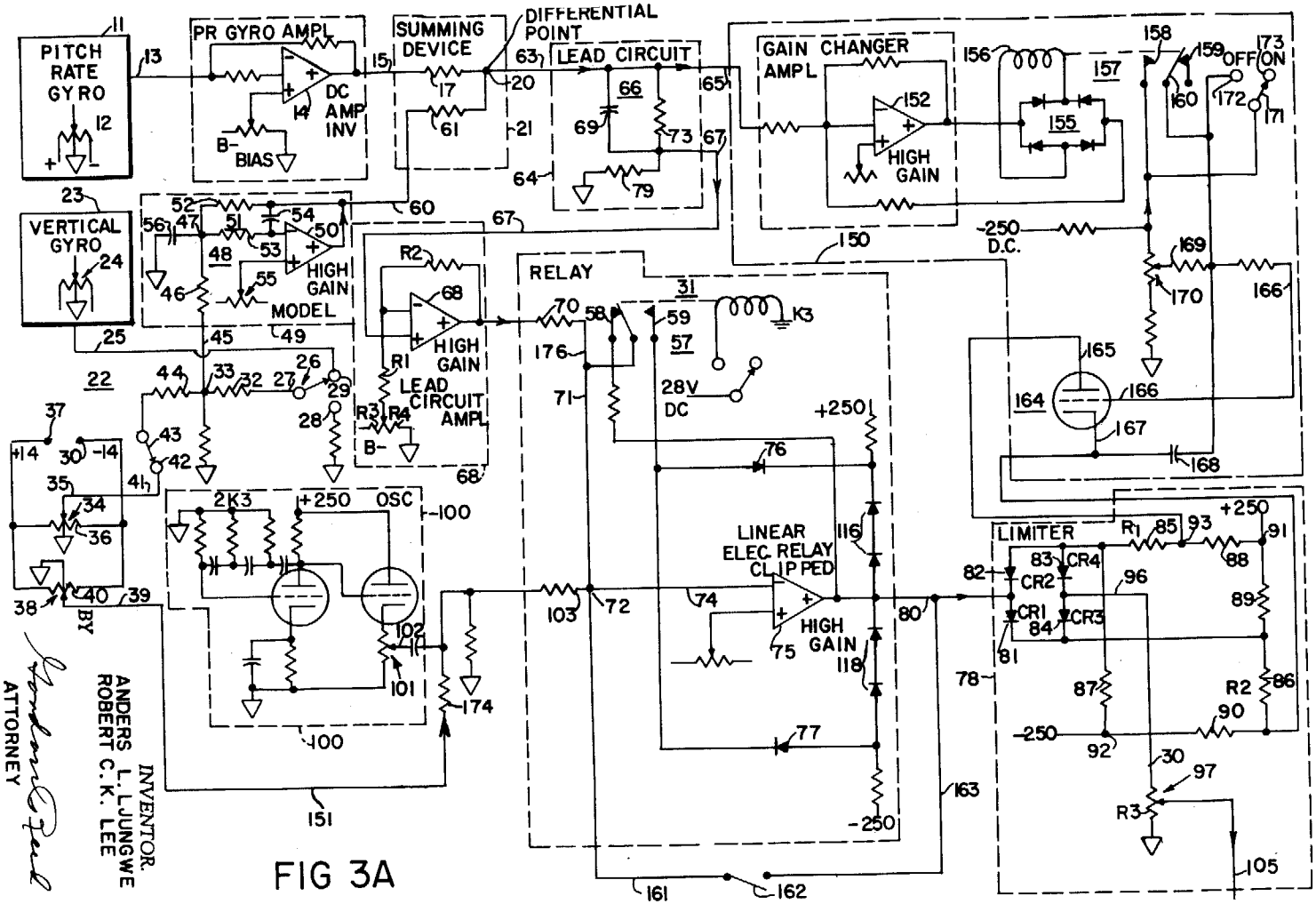
Figure 3B:
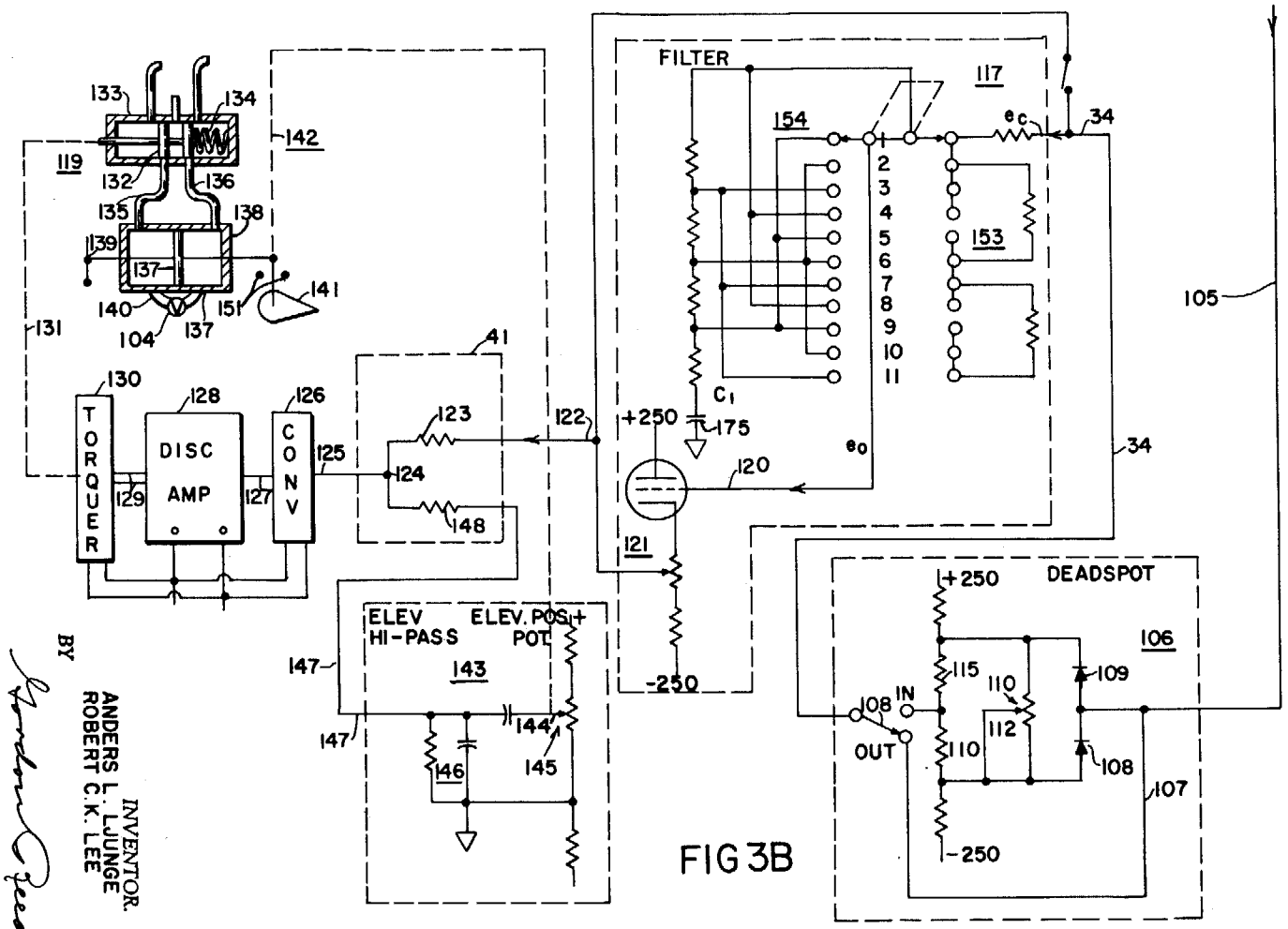
Figure 4:
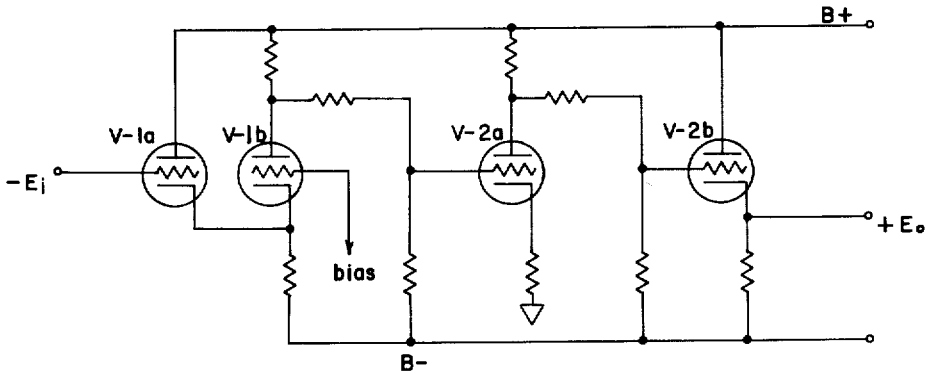
Figure 5:
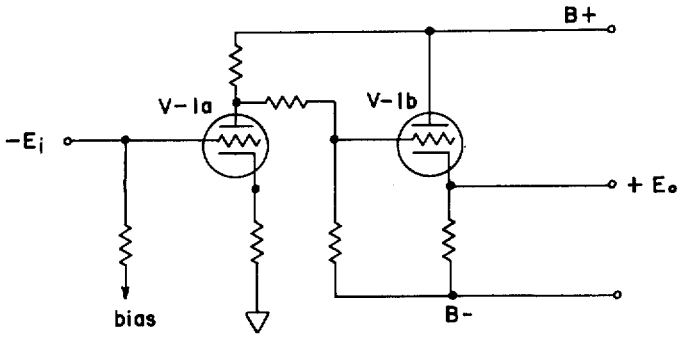
Figure 10:
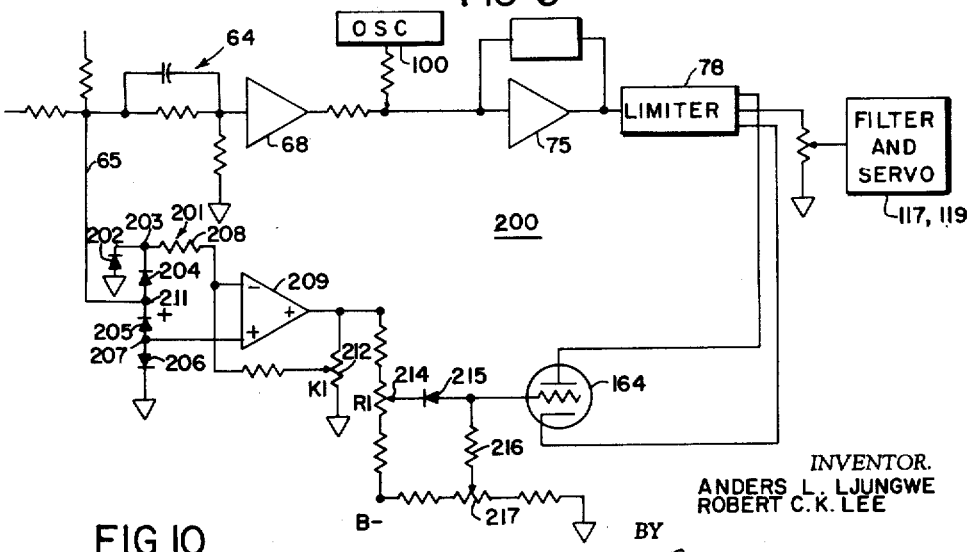
Figure 7:
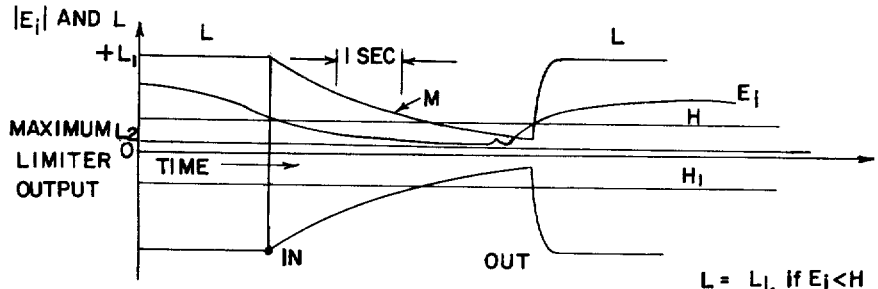
Figure 8:
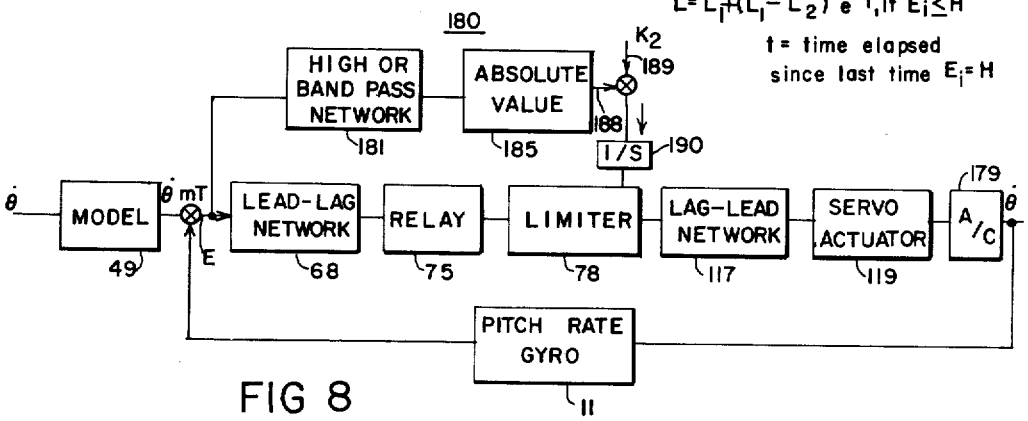
Figure 9:
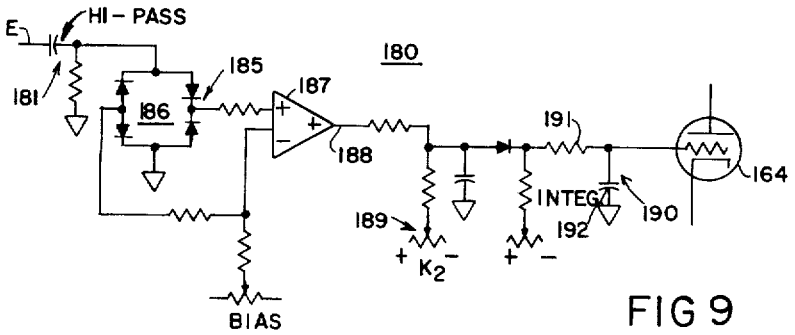
Figure 11:
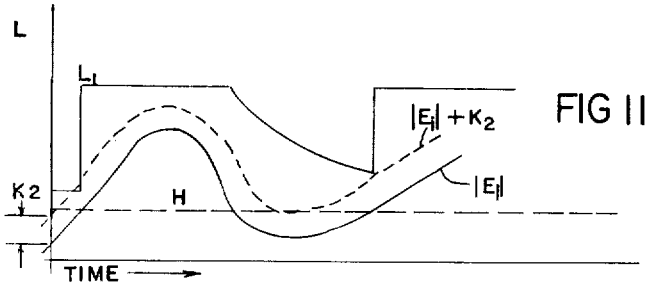

FIGURES 3A and 3B comprise an electrical schematic of the autopilot system;

FIGURE 4 is a form of amplifier utilized in the system;

FIGURE 5 is another form of amplifier utilized;

FIGURES 6A, 6B, 6C, 6D, 6E, 6F relate to forms of control of a portion of FIGURE 2;

FIGURE 7 is an example of the output of a limiter used in the arrangement;

FIGURE 8 is a block diagram of the system utilizing an alternative gain changer;

FIGURE 9 is a schematic of an alternative gain changer;

FIGURE 10 is a third form of gain changer;

FIGURE 11 is a comparison of the response of two alternative gain changers.

Figure 1:
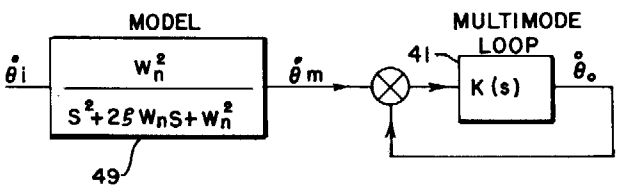
FIGURE 1 is a block diagram of a control system of general type embodying the invention.

Referring to FIGURE 1, a model 49 having an output that defines the desired operation of a system, operates through a multimode loop 41 to control the system.

Referring to FIGURE 2, the invention for illustration is applied to the portion of an automatic pilot which controls the condition of the aircraft about its pitch axis. The basic idea, fundamentally, in any autopilot or control system is to make the system respond to an input in a desired way. In other words, the control system should try to minimize the error between the desired response and the actual output. A control system must have the feature of "error sensing." In the present arrangement this "error sensing" is provided by obtaining the difference between the craft pitch rate response from a pitch rate sensing device 11 and a command pitch rate or desired response. The latter is introduced through a model 49. The model is the analog of the desired control apparatus-aircraft combination dynamics or response. The output of the model and the response of craft pitch rate gyro 11 are algebraically summed at summing device 21, the switching logic device.

In order to obtain the desired response, most systems have to be compensated by operating on the error. In some instances as in an electrical system this operation is provided by lead networks or other means. The compensation further may be obtained by linear or nonlinear means.

However, changes in the controlled system will influence the necessary compensation. Such changes may be due for example to the air speed and altitude environment of an auto pilot system. In an adaptive system as herein, the compensation, as will be explained, is changed which keeps the system performance constant.

Methods of compensation and of making the system adaptive may be effected in the present invention by utilizing discontinuous techniques. Discontinuous techniques are provided by passing the output from the summing device 21 through a passive network 64, amplifier 68 to an electronic type relay 75. This controller or electronic relay 75 may have the apparent input-output characteristics indicated in FIGURE 2, in a graph adjacent to relay 75. Consequently it provides a substantially continuous control for a servo 119 for small input signals. The influence from this controller or electronic relay 75 is much larger than the influence from air speed or altitude effects, consequently in effect cancellation of the dynamics of the controlled system is achieved by this nonlinear means.

Thus the compensation from the electronic relay 75 is applied to the system. However, if the magnitude of the compensation from the electronic relay 75 is too large, undesirable steady state "chatter" or small amplitude residual motion of the aircraft occurs. In order to avoid such "chatter," the operation of electronic relay 75 on servomotor 119 is modified in FIGURE 2 by a voltage limiter 78 which limits the maximum value of the voltage output from relay 75 that can be utilized to control the elevator servo 119. If a hydraulic type servomotor is utilized, it will limit the maximum ram rate or elevator surface rate displacement tending to reduce the chatter amplitude.

The output from the voltage limiter 78 is applied to a dead spot device 106 which device determines the minimum signal transmitted to control the servomotor 119. Consequently, in a steady state condition when the signals to the servo 119 would ordinarily be small, such small signals would not pass through the dead spot device. Thus no "chatter" operation of the elevator surface would occur within the dead spot or within the threshold of device 106.

The output from the dead spot device 106 is transmitted to a multi-position filter having the transfer function $$\frac{1+T_1s}{1+T_2s}$$

where $T_1$ is less than $T_2$. The filter compensates for large perturbations in control signals for the operating means for the elevator surface. The output of the filter 117 which is essentially direct current is applied to a D.C. to A.C. converter 126. From converter 126, the control is applied to a discriminator type servo amplifier 128 that operates a torque motor 130 for a control valve of a hydraulic type servomotor 119. Displacement of servo 119 from a normal position is applied to an elevator 141 and a hi-pass surface position device 143 which has its output algebraically summed with the output of the filter 117.

Since relay 75 is of high gain and saturates at small input voltage signals, its actual output is substantially that of an ideal solenoid operated relay and thus in the nature of a step output voltage of either polarity. Limiting the utilized voltage by the limiter 78 reduces the amplitude of chattering or residual oscillation of servo 119 and elevator surface 141 and of the aircraft. This is achieved by limiting the maximum elevator displacement rate. The limiter 78 did not as stated totally eliminate the "chatter." Chatter is cancelled by additional equipment now to be considered. A source 100 of cyclic changing voltage is provided in order to modulate the output of electronic relay 75. This, in essence, produces a small linear band in the relay for small error signals and thus the oscillation of the elevator surface 141 and the craft is eliminated. The output of oscillator 100 is applied to the electrical relay device 75 and is summed with the input signal applied thereto. Thus instead of a constant output being provided from the electronic relay 75 the average output increases with the magnitude of input signal in the manner indicated by the graph adjacent to the relay, FIGURE 2. A characterized output for the relay is provided by the oscillator 100 to reduce the chattering of the elevator surface and aircraft. In other words instead of the servo displacement rate having a fixed value for a small error signal, the displacement rate is decreased as the error signal is reduced.

While the arrangement as outlined thus far is primarily a pitch rate adaptive control system, an outer loop is provided by a pitch attitude sensing device 23 which through an input control 22 controls the model 49 to provide a desired integral of pitch attitude rate.

As thus far described, the subject invention involves an adaptive multimode control system. This multimode system as particularly applied to aircraft control apparatus in the subject invention differs from conventional autopilots in that it continually looks at its own performance and continually adjusts itself in a manner that yields constant behavior despite dynamic and static variations of control loop-parameters such as changes in natural frequency, damping and system gains. This type of multimode control system may be briefly considered by reverting to FIGURE 1. A desired response of the combined control apparatus aircraft is wanted. Such response for example may be defined by a second order system. To produce the desired response, a model concept is utilized. For example a selected command is applied to the model 49 and a desired aircraft pitch rate is derived from the model as a consequence. We may represent the control apparatus 41 for the aircraft and the aircraft itself as a multimode loop having a transfer function K(S). The closed loop response for the multimode loop is $$\frac{\dot{\theta}_0}{\dot{\theta}_m}=\frac{K(S)}{1+K(S)}$$

wherein $\theta_0$ is the response of the control apparatus-aircraft, $\theta_m$ is the output of the model 49, and K(s) is the transfer function of the control apparatus-aircraft 41, now if K(S) is much greater than 1, which results for a high gain servo, then $$\frac{\dot{\theta}_0}{\dot{\theta}_m}$$

is approximately equal to 1. Consequently $$\dot{\theta}_0=\dot{\theta}_m=\theta_i\times\frac{\omega 2_m}{s^2+2\zeta\omega_m s+\omega 2_m}$$

wherein $\theta_i$ is the input of the model, and the model 49 is a second order system as stated, having a natural frequency $\omega$ and damping ratio $\zeta$, and s is the Laplace operator. Thus there is a correspondence between the actual pitch rate, $\theta_0$ and the pitch rate desired.

Reviewing FIGURE 2, a selected direct voltage command signal of positive or negative polarity may be introduced from an input control 22 such as from the aircraft attitude sensor or a manual operable signal generator to a model 49. The model 49 shapes this command signal in the desired way to provide the desired response. The model output is summed with an actual pitch rate signal, derived from a pitch rate gyroscope 11 and amplified by a pitch rate amplifier 14, at a summing device 21. The resultant voltage signal or difference between the model or desired pitch rate and craft actual pitch rate, termed an error rate signal, is passed through a lead circuit 64 to convert it from a purely rate error to an error signal having additionally an acceleration or derivative of error component. Amplification of this converted error signal is provided by amplifier 68 from which the amplified signal drives an electrical relay 75. The relay 75 is of the type which has a discontinuous or on-off output of fixed magnitude but of a polarity dependent on that of its control signal and thus may resemble an ideal mechanical type relay. The output from the relay 75 is operated on by a limiter 78. The limiter establishes the maximum output signal derived from relay 75 to be applied to control a servo-means 119. A variable dead spot control 106 filters low level noise in this essentially D.C. signal system. Thereafter the voltage for control is appiled to a variable filter 17. The filter removes the high frequency noise from the control signal and provides phase compensation. The output from the filter is summed with a high passed servo position signal from signal generator 143. After such summing, the D.C. signal is converted to A.C. by convertor 126 and applied to an A.C. discriminator servo amplifier 128. The amplifier controls a torque motor or torquer 130 which in turn operates or positions a control valve of a hydraulic servo motor 119. The servomotor displaces the elevator control surface 141 at an average rate dependent on the magnitude of the average output of amplifier 128 and also operates the elevator position signal generator 143 which through conductor 147 supplies a control signal summed with the output of filter 117. Input control through conductor 151 conditions the amplifier 128 to repsond to input control signals.

While this system as thus far described may be suitable for a condition control system such as an aircraft operating within average flight conditions of altitude and air speed within which the maximum rate of operation of the hydraulic servomotor 119 is sufficient to give desired control for average change of system parameters, yet for a wider flight envelope for widely varying aircraft, higher rates of operation of the hydraulic servo 119 may be desired. For this purpose, a gain changer 150 which co-acts with the limiter 78 to vary the maximum utilized output control signal is provided.

Mechanization details, to a large extent, of the invention are illustrated in FIGURES 3A, 3B. In FIGURE 3A, a rate gyro 11 responsive to the pitch rate of the craft operates a D.C. energized potentiometer to derive a pitch rate signal variable in magnitude and in polarity depending upon the direction and extent of displacement of its slider from a center tap of potentiometer resistor 12 connected to signal ground. The output of the potentiometer is supplied over conductor 13 to a pitch rate gyro amplifier 14. This amplifier 14 may be used where a low sensitive rate gyroscope is utilized. The amplifier may not only amplify the D.C. voltage signal but also serve as an inverter. The output from the amplifier 14 is applied over conductor 15 to a summing resistor 17 and thence to a summing point 20 in summing device 21.

Initiating or input control signals are provided by an arrangement 22. This arrangement comprises a vertical gyroscope 23 for sensing craft pitch attitude, and gyroscope 23 operates a potentiometer 24 to provide an attitude signal of variable magnitude and of reversible polarity depending upon the craft pitch attitude. The pitch attitude signal of potentiometer 24 is applied over conductor 25, through a two position switch 26, conductor 27, a summing resistor 32 to a summing point 33.

A pilot command signal of a selected polarity and magnitude is provided by a manually operated potentiometer 34 having a slider 35 and resistor 36. Resistor 36 is connected to the terminals 30 and 37 which receive the D.C. supply voltage. A center tap of resistor 36 may be connected to signal ground having a voltage corresponding with the center of the voltage supply. Included in the arrangement 22 is a pilot trim potentiometer 38 having an adjustable slider 39 coacting with a center tapped resistor 40. The opposite ends of resistor 40 are also connected to supply terminals 37, 38. The purpose of potentiometer 38 will be hereinafter discussed.

The output from potentiometer 34 is transmitted by conductor 41, selector switch 43, and summing resistor 44 to summing point 33. From summing point 33 the input control signal is transmitted by conductor 45 to the model 49.

The analog model 49 is of the electrical type and comprises a high gain amplifier 50 and a network 51. The model therein is characterized by a second order response, that defines the relationship between model input and output, but the model alternatively may be characterized in accordance with a higher or lower order response. From summing point 33 as stated the signal is supplied through a resistor 46 in model 49 to a terminal 47. From terminal 47 the signal is supplied through a resistor 53 to a control electrode of amplifier 50. The resistor 53 is shunted by resistor 52 and capacitor 54. Additionally the other control electrode of amplifier 50 is controlled by a potentiometer 55. Terminal 47 is additionally connected to signal ground through a capacitor 56. The output of the amplifier 50 is fedback through resistor 52 to terminal 47. Resistors 46, 52, and 53 are of equal value and capacitors 54 and 56 were chosen to provide a damping ratio ($\zeta$) of 0.7 approximately and a resonant frequency ($\omega$) of 3 radiants to give the model 49 the desired characteristics of gain, damping and natural frequency. The output voltage of the model 49 is supplied by conductor 60, summing resistor 61, to summing point 20 whereby the model output or desired rate voltage is algebraically parallel summed with the pitch rate gyro output voltage as amplified, a typical voltage is 3 volts per degree per second pitch rate of the craft. From summing point 20 a conductor 63 supplies the error rate voltage to lead circuit 64 or lead network 66.

The lead network or computer 66 in a typical instance comprises a capacitor 69 considered as (c) having a capacity of 1 microfarad, a .22 megohm resistor 73 considered as ($R_1$) shunting the capacitor and a 0.016 megohm series resistor 79 considered as ($R_2$). The transfer function of this network 66 disregarding constants of the network is $$\frac{1+.22S}{1+.015S}$$

See "Servo-mechanisms and Regulating System Design" by Chestnut and Mayer, 1951, vol. 1, page 255. The output from the lead circuit 64 which is utilized to control the elevator servo 119 is transmitted by conductor 67 to a lead circuit amplifier 68.

The lead circuit amplifier is identical to the amplifier in FIGURE 4 to be described except that the bias and signal grids are reversed, feedback to the grid is not changed. The amplifier gain is established through the ratio of feedback resistance to bias circuit resistance $$=\frac{R_2}{R_1\,\frac{R_3\,R_4}{R_3+R_4}}$$

with the resistors as indicated. By interchanging the input grids, the amplifier may be used to provide gain with no signal reversal. The gain is controlled by the feedback voltage being cathode summed with the signal voltage.

The output from lead circuit amplifier 68 is transmitted through summing resistor 70, conductor 126, and conductor 71 to a summing point 72. The lead circuit amplifier output signal is summed with a cyclic varying alternating voltage such as an output of an oscillator 100 which develops a cyclic varying voltage signal of two kilocycles. The output of the oscillator 100 appears across the voltage dividing potentiometer 101 having adjustable slider 102. Slider 102 is connected through a capacitor and summing resistor 103 to summing point 72. If desired the slider 102 may be moved to a lowermost position in the figure at which time no signal from the oscillator 100 is supplied to summing point 72.

The voltage at summing point 72, which consists of the output of amplifier 68 and the adjustable 2 kc. modulation signal, is supplied by conductor 74 to electronic relay 75. The relay 75 uses the amplifier in FIGURE 4 to be described. Associated with the relay 75 is a mechanical relay 57 having an out-contact 58 and an in-contact 59. These relay contacts are in the relay amplifier input circuit so a selection may be made between two types of feedback. In unenergized condition, contact 58 of relay 57 provides linear resistive feedback of relay amplifier 75 for an amplifier gain of 1, but in energized condition feedback limiting occurs.

For such limiting, diodes 116, 118 establish a 10 volt reference voltage. When relay 57 is energized, and whenever the output voltage tends to exceed the established reference voltage, one of the diodes 76 or 77 will start to conduct thereby limiting the output to the established voltage. Signals from summing point 72 to amplifier 75 which produced less than the established voltage output cause no feedback. The arrangement is designed so that signals of $\pm 4$ millivolts input or more, drive the amplifier to limiting thus having the impression of an ideal relay and hence the terminology applied.

The effect of the cyclic wave from the two kilocycle oscillator 100 on high gain relay 75 will be subsequently discussed.

The output of the relay 75 is applied via conductor 80 to a further limiter 78 which may be required. The limiter comprises diodes 81, 82, 83 and 84 and primary resistors 85, 86. The diodes 81, 82 are connected in series, and parallel thereto are diodes 83 and 84. Resistor 85 is in series with both parallel sets of diodes as is also resistor 86. The limiter 78 serves to balance the relay output peaks to the same peak amplitude. Limiting is accomplished through a bridge limiter composed of the diodes 81, 82, 83, and 84.

For purposes of explaining the operation of the limiter the following identities are assumed: diode 81 is $CR_1$, diode 82 is $CR_2$, diode 83 is $CR_4$, and diode 84 is $CR_3$. Resistor 85 is $R_1$ and resistor 86 is $R_2$. Assuming that the input voltage on conductor 80 to the limiter 78 is zero and $R_1$ equals $R_2$ then all electron flow through $R_2$ passes through the parallel series branches of diodes and up through $R_1$ to B+. The voltage drop across the diodes is essentially zero, so if the input voltage $E_1$ on conductor 80 is zero then the voltage output $E_0$ on conductor 96 must be zero because the diodes are parallel with no voltage drop across them.

If input voltage, $E_1$, is increased sufficiently positive, all input current will be through $R_2$ and $CR_1$. The current through $CR_2$ would be zero and all current through the output circuit would be through $R_3$, $CR_4$ and $R_1$. $E_0$ is then equal $$\frac{R_3}{R_1+R_3}$$

for $E_1=10$ volts. $CR_2$ and $CR_3$ are non-conducting. The reverse is true when $E_1$ is negative, $CR_2$ and $CR_3$ are conducting and $CR_1$ and $CR_4$ are non-conducting.

The output of the limiter 78 is applied to an adjustable voltage dividing potentiometer 97 and is thereafter transmitted by conductor 105 to the dead spot arrangement 106 FIGURE 3B which serves to reduce low level noise in the control signal system. The dead spot arrangement 106 employs two biased diodes 108, 109 which do not pass the signal until the bias is exceeded by the signal level. Bias is adjusted from the potentiometer 110 through its adjustable slider 112. The dead spot may be selectively bypassed by a single pole double throw switch 108 and conductor 107, when desired.

The output from the dead spot is transmitted by conductor 34 to a filter 117. The filter provides system phase compensation and additional filter to remove the 2 kilocycle relay modulation which at this point in the system represents unwanted noise. Filter 117 comprises a resistor arrangement 153 with various taps, a variable resistor arrangement 154, and a capacitor 175. Denoting variable resistor 153 by $R_1$, variable resistor 154 by $R_2$, and capacitor 175 by $C_1$ the transfer function $E_0/E_1$ of this filter is $$\frac{1+T_{15}}{1+T_{25}}$$

where the time constant $T_1$ equals $R_2C_1$ and $T_2$ equals $(R_2+R_1)C_1$. In effect $E_1$ is connected to $R_1$ which in turn is in series with $R_2$ and $C_1$ in order, to signal ground. The junction of $R_1$ and $R_2$ is the voltage out, $E_0$. Thus the voltage out over the voltage in is equal to the transfer function mentioned.

The output from the filter 117 is transmitted by conductor 120 to a cathode follower 121, and from the cathode follower the control signal is transmitted by conductor 122 through summing resistor 123 to a summing point 124. The D.C. control signal at summing point 124 is applied through conductor 125 to a D.C. to A.C. convertor 126, such as a vibrator, whose A.C. output through conductor 127 controls an A.C. discriminator type amplifier 128.

The output of amplifier 128 through conductors 129 energizes an amplifier phase winding of a torquer 130. Another phase winding of this torquer is energized from an A.C. supply line which also supplies amplifier 128 and converter 126. The torquer may be a conventional two phase induction motor which positions a control valve 132 of a hydraulic type servomotor 119 by suitable operating means 131.

The valve 132 is housed within a casing 133 with the valve normally centered within the casing by suitable spring means 134. From openings in the valve casing, conduits 135 and 136 transmit pressure fluid, upon displacement of the valve from a normal position shown, to either side of a ram 137 within a ported cylinder 138. The ram 137 may be connected at one end to a conventional aircraft control stick 139 and at its opposite end operates an elevator control surface 141. For purposes of direct manual control of the elevator, a bypass conduit 140 connects opposite sides of the ram 137 which conduit includes a control valve 104 to close off the bypass. The amplifier, torquer, hydraulic servo combination may be similar to that disclosed in U.S. Patent 2,646,-947 to Kutzler and Taylor. In the present arrangement however the servomotor is used as a parallel servo. The opration thereof is communicated to the pilot control stick of the aircraft.

Operation of the ram 137 of the servo 119 is also transmitted by follow up means 142 to an elevator position signal voltage generator 143. The signal generator 143 includes an adjustable potentiometer 145 having its slider 144 driven by the operating means 142. The output from the potentiometer slider 144 is applied through a high pass network 146, conductor 147 and a summing resistor 148 to summing point 124.

The pilot operated potentiometer 38 FIGURE 3A previously described has a slider 39 connected by conductor 151 and summing resistor 174 to summing point 72. Consequently, the adjustment of slider 39 may be used to trim the voltage unbalance in control 22 which might otherwise cause operation of the relay 75 prior to automatic control. This trim potentiometer 38 also may be used to balance any signals up to this point of the control system because of residual unwanted signals.

Concerning the amplifiers, two forms of D.C. amplifiers FIGURES 4 and 5 are used in the adaptive multimode autopilot. One variety uses two 12AX7 tubes the other uses one. FIGURE 4, the high gain version uses a cathode follower input stage V–1a and this is cathode coupled to V–1b. V–1b is the first voltage amplifier with an output taken from the plate. The plate is direct coupled through a resistive divider to the grid of V–2a, the second voltage amplifier. Output from V–2a is taken at the plate which is then coupled through a resistive divider to the grid of V–2b. V–2b is a cathode follower and as such provides a low output impedance. The bias on V–1b is adjusted to provide zero volts D.C. at the cathode of V–2b when the input grid voltage of V–1a is zero. The open loop gain of this amplifier is about 2500, and with negative feedback, the stability is improved with reduction of gain.

The gain of the amplifier with resistive feedback as illustrated by amplifier 68 FIGURE 3A is equal to the ratio of the feedback resistor to the input resistor. The amplifier of FIGURE 4 is used in the model, lead circuit amplifier, relay, and gain changer with the major differences occurring in the method of supplying the negative feedback.

The amplifier in FIGURE 5 is identical to the second half of FIGURE 4 with bias applied to the grid of the first stage. V–1a is a voltage amplifier and the output is taken from the plate. A resistive divider from the plate couples the signals to the grids of V–1b a cathode follower. This amplifier has a lower gain but when operated at a gain of 1 provides good stability sign reversal and low output impedance.

Figure 6A:
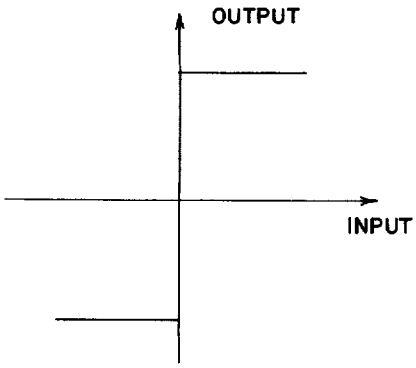

Concerning the output voltage of amplifier relay 75, the relay 75 when receiving control signals only from conductor 71, at which time the slider 102 of potentiometer 101 of oscillator 100 is the down position shown of the arrangement, has an output characteristic shown in FIGURE 6A. This output is what may be considered a pure on-off or discontinuous control or step control and may be used with dynamic restrictions on the automatic pilot and aircraft. This control system thus far has a mechanical vibration limit cycle of constant frequency with an amplitude obeying the expression, $L=gAM_{\delta e}$ where L=amplitude of limit cycle, g=constant, A=amplitude of relay output, $M_{\delta e}$ is the elevator effectiveness which is proportional to high frequency gain.

However, when the system parameters are not ideal, a discontinuous output as in FIGURE 6A does not provide the desired control. Nevertheless, the multimode loop can be compensated by shaping the output characteristic of relay 75. This characterization of the output of the relay is preferably provided by superimposing a high frequency alternating or cyclic voltage from oscillator 100 on the relay signal input. When the cyclic voltage varying in magnitude and polarity from the oscillator 100 is superimposed on the D.C. voltage on conductor 71 to the relay 75 an output from relay 75 takes the form of FIGURE 6B.

Figure 6B:
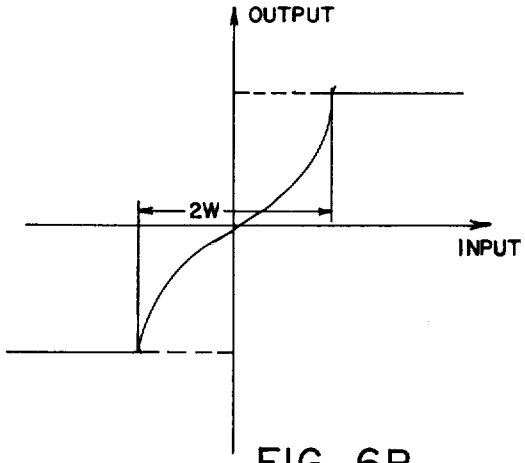
Figure 6C:
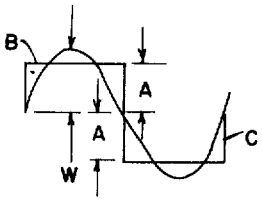
Figure 6D:
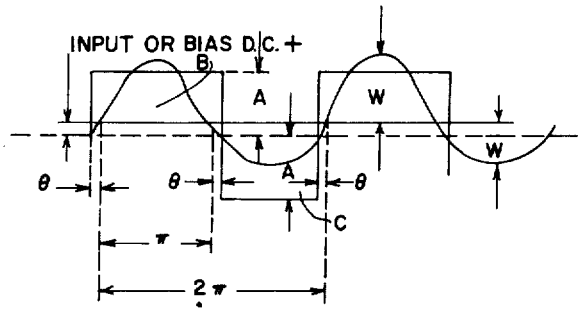

The apparent output of relay 75, when receiving a control signal on conductor 71 and also simultaneously a cyclically changing signal such as a sinusoidal signal from oscillator 100, as shown in FIGURE 6B may be understood by reference to FIGURE 6C. For purposes of explanation, assume only that the oscillator A.C. input is applied to relay 75. Bearing in mind that the relay 75 includes a high gain amplifier which has full output for small input signals, its output is in a form of a square wave or discontinuous signal. It is further evident that by reference to the sine wave signal from the oscillator which has positive and negative values, that the relay type output above the zero ordinate and which area is identified by the character B has the same area as the square wave area identified by C, below the line and the average relay output is zero. Note also that the amplitude A of area B equals the amplitude A of area C.

In FIGURE 6B, the average output of the relay 75 is illustrated when a D.C. voltage control signal from conductor 71 as well as the cyclic varying voltage from oscillator 100 are simultaneously applied thereto. The voltage on conductor 71 for purposes of explanation may be viewed as a D.C. bias signal. In FIGURE 6B this bias signal is represented as being of plus or minus polarity. Perhaps FIGURE 6B may be more easily understood by discussion of FIGURE 6D and by considering the second half wave of the cyclic signal, illustrated as a sine wave. Note that in the second half of the cycle that instead of the negative square wave C appearing as soon as the cyclic wave crosses the zero ordinate mark as in 6A, that the sine wave must first build up a slight negative value overcoming the D.C. positive bias or control signal, consequently an angle $\theta$ in radians of the second half cycle must elapse before a negative square wave can be formed. It is also clear that before two $\pi$ radians of the cycle have been attained that the decreasing negative voltage of the sine wave is equal but opposite to the D.C. bias so that the negative square wave terminates. The point at which the square wave terminates is also an angle $\theta$ in radians short of the $2\pi$ radians of the cycle. On the other hand the base of area B has been increased by the magnitude $\theta$ radians at each end of its half cycle.

We may say that with cyclic input along with a bias input that area B now equals $A(\pi+2\theta)$ and area C equals $A(\pi-2\theta)$. The average output for relay 75 is equal to $A(\pi+2\theta)-A(\pi-2\theta)$ divided by $2\pi$. Reducing $$A\frac{(\pi+2\theta-\pi+2\theta)}{2\pi}=\frac{4A\theta}{2\pi}=\frac{2A\theta}{\pi}$$

$\theta$=angle in radians.

It is clear that when the maximum magnitude of the sine wave equals W at $$\frac{\pi}{2}$$

and is equal to the positive D.C. bias no conduction is present for the lower half cycle. In other words $$\theta=\frac{\pi}{2}$$

and there is a continuous positive square wave output whose ordinate represents the average output A for the D.C. bias or input equal to the magnitude W of the cyclic input.

From this magnitude of cyclic input and from the sinusoidal cyclic curve, W equals sine of $$\frac{\pi}{2}$$

For intermediate ordinates between O and W of the cyclic curve which ordinates similarly can be considered D.C. inputs, input also equals W sin $\theta$. The average intermediate output for values of A<W will be considered from $$\frac{2A\theta}{\pi} \text{ and } W$$

This results in an expression $$\sin\theta=\frac{\text{input}}{W}$$

therefore, $$\theta \text{ is equal arc sin } \frac{\text{input}}{W}$$

whereby the general expression average output $$=\frac{2A}{\pi} \text{ arc sin } \frac{\text{input}}{W}$$

follows.

Figure 6E:
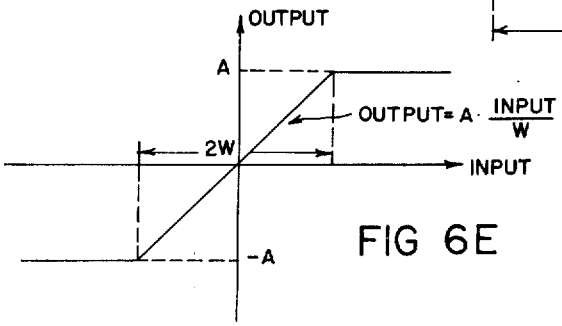

In FIGURE 6E, an apparent output curve for relay 75 is shown when a triangular wave along with a control signal on conductor 71 are simultaneously applied to the relay 75.

Figure 6F:
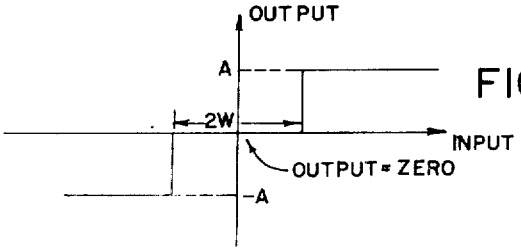

FIGURE 6F shows the average output for relay 75 when a cyclic square wave instead of a triangular wave or sin wave is applied simultaneously to the relay 75 along with a control signal on conductor 71.

It is apparent from the three examples given that any desired intermediate average output for a relay 75 may be obtained between ordinates + or — polarity defining the full output of the relay which output is obtained after the input control signal equals the maximum magnitude of the particular form of cyclic signal applied.

It is further clear that while FIGURE 6B has been considered when the signal on conductor 71 was positive, a similar result is obtained if the bias signal is negative at which time the average output of relay 75 would be in the form of the curve of FIGURE 6B to the left of the origin.

It will be further evident that with the slider 102 adjusted downward as desired to decrease the maximum amplitude of the cyclic signal (W) that the intermediate or modulation portion of output curve of FIGURE 6B will rise more sharply than that as shown in FIGURE 6B. Thus the net average output of the relay 75 becomes a function of the maximum amplitude of the cyclic voltage applied thereto which voltage is in addition to the conventional control signal on conductor 71.

The average output of relay 75 is one of the factors that determine the magnitude of the control input signal to the discriminator amplifier 125 and thus determines the magnitude of torque from motor 130 applied by hydraulic servo valve 132 which operates against the restoring force of spring 134. Thus the magnitude of displacement of the control valve is proportional to the average output from relay 75. The rate of operation of the servo ram 137 depends upon the rate of flow of the pressure through fluid conduits 135 or 136 to opposite sides of the ram. It is clear that the quantity of fluid flow is dependent upon the valve displacement since more or less of the conduit cross sectional area in the valve casing 133 is exposed in accordance with the displacement of valve 132.

Consequently, when the error rate signal is small indicating that the actual craft pitch rate and desired pitch rate are nearly equal, the output of the characterized relay 75 follows along the characterized curve and the rate of operation of the hydraulic servo 119 is reduced from maximum rate. This reduction of the operation rate of the servo reduces the "chattering" in the system in the sense that it reduces the amplitude of oscillations of the elevator surface or attitude control means.

The gain changer 150 includes a high gain feedback amplifier 152 which receives a signal which is the difference between the aircraft pitch rate $\theta_0$ and the commanded pitch rate $\theta_m$. The output from the amplifier 152 passes through a rectifier 155 to provide a unidirectional current varying with the absolute value, $|E|$, of the error signal for energizing an operating winding 156 of a mechanical type relay 157. This arrangement facilitates provision of a time delay for relay dropout if such delay is desirable.

Relay 157 includes an operating contactor 160 which co-acts with in contact 158 and out contact 159. Relay contacts 158 and 159 activate or deactivate a two second time constant in the gain changer limiter control tube 164. Control tube 164 includes a plate 165, a grid 166, and cathode 167. The control tube 164 loads the + and — load resistors 88, 90 in the limiter 78. The control tube 164 controls the voltage level to which the basic limiter works by acting as a shunt load across the bridge and limiter. As the voltage level is reduced, the limit level is reduced.

Opening the contacts of relay 157, that is when contactor 160 engages contact 159, permits the capacitor 168 to start charging to a less negative voltage thereby allowing tube 164 to start conducting. As previously stated, this reduces the limiting level since the conduction through the tube becomes greater thereby more heavily loading the resistors 88, 90. The setting of potentiometer 170 determines how far the capacitor 168 will charge and therefore, the shunt current through control tube 164 and the final limit level.

Either by engaging relay contactor 160 with contact 158 in the gain changer manually operable switch 171 and its associated contact 172 discharges capacitor 168 to its standby condition.

Due to the combination of capacitor 168 and resistor 169, when relay 157 is deenergized so that contactor 160 engages contact 159, the voltage on grid 166 of control tube 164 increases exponentially (approximately 2-second time constant) and control tube 164 conducts significant quantities of current. This current flow induces a voltage drop across the limiter and reduces the maximum limiter voltage.

The form of the transient envelope of limiter 78 is shown in FIGURE 7. Thus whenever the error $E_1$ on conductor 65 has an absolute value (due to the rectifier 155) independent of polarity sufficiently large to energize relay winding 156, the maximum amplitude of output of relay 75 shown at L, FIGURE 7 controls the hydraulic servo. Because of the use of the absolute value of $E_i$, the operation of the limiter is independent of the polarity of $E_i$. However, when the absolute value of the error signal on conductor 65 is decreasing and passes through the magnitude sufficiently large to energize relay operating winding 156, a decay circuit is switched in with the resulting exponential decrease of amplitude of output of relay 75 shown at portion M of curve L FIGURE 7 utilized to control the hydraulic servo 119. Thus as the error signal which is the difference between the actual pitch rate and commanded pitch rate of the craft becomes small, the maximum setting for the limiter 78 is reduced so that a smaller average voltage from relay 75 is available to operate hydraulic servo motor 119. In other words the maximum rate of operation of the servo 119 is reduced because of the lower limiter setting. This means, the amplitude of "chattering" of the condition control device such as the elevator of an aircraft is reduced in accordance with the expression $L=gAM\delta e$.

In FIGURE 7 changes in output of the limiter with changes in the error signal on conductor 65 is illustrated. Because of the device 115, the absolute error effect $|E|$ independent of palarity is obtained. Considering the curve, $|E_i|$ as the error signal exceeds a minimum sufficient to energize relay 157 which minimum is represented by a continuous horizontal line H, a maximum limiter output $L_1$ is obtained. When the error signal decreases and crosses the horizontal line H relay 157 is deenergized and through the decay circuit, a lower maximum limiter output along curve M, a section of L, is set. As the error signal thereafter increases, it again crosses the horizontal line H at which point the relay 157 is again reenergized and the maximum limiter output $L_1$ is obtained. Points "in" and "out" of FIGURE 7 denote the operation of the decay circuit.

In a similar manner, if the error signal be negative, E−, changes in the maximum limiter output will occur as the error signal falls above a continuous horizontal line H shown in FIGURE 7. The magnitude of L may vary between fixed outputs $L_1$ and $L_2$.

The gain changer 150 of FIGURE 2 controls the voltage limiter 78 so that in the steady state either a maximum or a single lesser fixed output voltage is obtained from the voltage limiter 78. In some instances, it may be desired to provide a variable voltage output from limiter 78 instead of one or another of two fixed voltages. This variable voltage output is provided by a variable gain changer for the voltage limiter. This gain changer is illustrated system wise in FIGURE 8 and is illustrated in detail in FIGURE 9.

In FIGURE 8, the model 49 has its output summed with the response of the craft pitch rate gyro 11, the resultant voltage is applied to lead-lag network 68 which controls the electronic relay 75. The output from relay 75 is applied to the limiter 78 from whence control is extended through a lead network 117 to the servo actuator 119. This servo actuator positions attitude changing means of the aircraft resulting in an attitude rate change of aircraft 179 with a resultant sensing of attitude rate by the pitch rate gyro 11.

The gain changer 150 of FIGURES 3A and 3B has been replaced in FIGURE 8 by a variable gain changer 180 in a system which could dispense with oscillator 100. The mathematical expression for the output of limiter 78 when controlled by the limiter 180 is output magnitude$=K_1+E_i+K_2$ wherein $K_1$, $K_2$ are constants and $E_i$ varies in accordance with the absolute value of the error rate signal.

In FIGURE 8 the variable gain changer 180 comprises a high frequency oscillation band pass network 181, an absolute value device 185, having its output appearing on transmitting means 188 summed with the value $K_2$ on transmitting means 189. The resultant sum controls an integrator or lag device 190 which in turn exerts control or limiter 78.

Details of the variable limiter 180 are shown in FIGURE 9 wherein the band pass network 181 passes the frequencies of the limit cycle. It comprises a high pass capacitor resistor combination which receives the error rate signal from conductor 65 FIGURE 2. The absolute value device 185 comprises for example a bridge rectifier 186 and an amplifier 187 so that irrespective of the polarity of the error rate signal, the absolute value of the error rate constitutes the output from amplifier 187. The output of amplifier 187 on conductor 188 is the quantity $K_1E_i$. This quantity is summed with the quantity $K_2$ from the adjustable resistor 189. The resultant sum is applied to the integrator 190. The integrator may be an integrating amplifier or as shown comprises a resistor 191 and a capacitor 192 connected in series. One end of capacitor 192 is connected to signal ground and the junctin of resistor 191 and capacitor 190 is connected to the grid electrode of tube 164. The input to the integrator is applied to the remaining end of resistor 191.

It will be apparent from the arrangement that when the absolute error rate is zero that the limiter output is equal to $K_2$ but that for other values of the absolute error rate a variable magnitude output from voltage limiter 78 is provided.

FIGURE 10 is a further variation of a gain changer to provide a variable output to limiter 78 between a maximum and minimum fixed outputs rather than having the limiter 78 provide one or another of two fixed output voltages. In FIGURE 10, the gain changer 200 comprises a diode arrangement 201 consisting of a clamping diode 202 connected between signal ground and a terminal 203, a pair of absolute value producing diodes 204, 205 and a further clamping diode 206 connected between a terminal 207 and signal ground. Terminal 203 is connected through a resistor 208 to a negative control electrode of gain changer amplifier 209. Terminal 207 is connected to the positive control electrode of amplifier 209. Conductor 65 is connected to terminal 211 between diodes 204, 205 having their remaining sides connected to terminals 203, 207 respectively. When terminal 211 becomes negative, clamping diode 202 is effective whereas when terminal 211 becomes positive clamping diode 206 becomes effective. The feedback circuit is provided for amplifier 219 through an adjustable voltage divider 212 which provides a gain factor $K_1$. The output of amplifier 209 is applied across a resistor $R_1$, having an adjustable slider 214, connected to B−. This slider 214 is connected through a diode 215 to the grid of tube 164. The junction of diode 215 and the grid of tube 164 is connected through a resistor and adjustable slider 216 to supply a bias $K_2$, since the slider 216 engages a resistor 217 connected between B− and signal ground. The output of control tube 164 as before is connected to the limiter 78. $K_1$ adjusts the sensitivity of the amplifier 209. $R_1$ sets the minimum amplitude where the gain changer has an effect. $K_2$ is the bias for the limiter control tube 164 and establishes the minimum limiter output. The limiter output therefore may be defined as amplitude $L=K_1|E_i|+K_2$.

The advantage of the arrangement of FIGURE 9 previously described over that of FIGURE 10 is that in the arrangement of FIGURE 9 only the high frequency signals denoting a chattering condition or those of the limit cycle frequency control the change of the setting of limiter 78 whereas low frequency rate error signals due to transient or external disturbances of the craft are blocked and do not affect the limiter output. This "chattering" is actually an indication of the response of the system or its following relative to a desired control condition. The desired control condition may have been set up through the input controller. In this respect the gain changer of FIGURE 9 provides a self evaluation of the system since the disparity between the control system operation and the desired operation, indicative of chattering, is utilized to vary the operation of a component of the system.

FIGURE 11 illustrates a comparison of the gain changer for the limiter provided by the arrangement 200 as compared with that provided for the gain changer 150 of FIGURE 2. The lower curve illustrates the error rate signal as it varies with time. The upper curve having flat peaks illustrates the form of control output for the limiter provided by the gain changer 150. The intermediate curve illustrates substantially the limiter output achieved by the variable gain changer 200 for the limiter 78. Note that the lower limit is $K_2$ which is the separation of the two lower curves, otherwise the limit varies continuously.

Reverting to the arrangement of FIGURE 9 for variably changing the output of limiter 78, the filter input passes the high frequency oscillations or chattering of craft pitch rate while the craft is seeking to fly a commanded pitch rate. The low frequency pitch rates, as due to wind gusts are not transmitted by the filter. Similarly commanded pitch rates which may be variously selected at will do not pass through the filter to affect the output of limiter 78. However oscillations of the craft pitch rate about the selected pitch rate, which are of high frequency are transmitted by the high pass filter 181. It is desirable that the amplitude of such oscillations be reduced and this is achieved by changing the average output of the limiter with the magnitude of such oscillation. This device is thus able to measure the aircraft elevator effectiveness and adjusts the system loop gain, to the limiter setting accordingly.

OPERATION

The apparatus of FIGURES 3A, 3B operates in the pitch channel, as a pitch rate control system and also as an attitude control system. Upon the occurrence of a pitch rate signal, the error rate signal appears on conductor 63 which is modified in the lead circuit 66. The output of the error signal as modified in the lead circuit 66 is transmitted by conductor 67 to amplifier 68. From amplifier 68 the control voltage and the cyclically varying voltage from oscillator 100 are combined and applied to the electronic relay 75. The output of the relay 75 during large input signals on conductor 65 which exceed the amplitude of the voltage from oscillator 100 is constant in magnitude. This magnitude of voltage passes through the limiter 78 which determines the actual magnitude of the control signal to be utilized. This voltage passes through the dead spot arrangement 106, the filter 117, amplifier 121 and controls the converter 126. The output of the convertor energizes amplifier 128 which in turn energizes the torquer 130 in one direction or another depending on the polarity of the control voltage on conductor 125. The torquer in turn operates the control valve 132 in one direction or another to partially expose the cross sectional area of conduits 135 or 136 permitting pressure fluid to pass to one or the other sides of ram 137. This pressure on ram 137 effects operation of the elevator surface 141 and the operation of the follow-up signal generator 143. The signal through the high pass network 146, tends to rebalance the input to convertor 126 on conductor 125 discontinuing energization of torquer 130 and permitting the valve centering spring 134 to return the control valve 132 to unoperated position. Due to the high pass effect to network 146 of the follow-up signal generator 143, the displacement rate of ram 137 is in accordance with the error signal on conductor 74 applied to the relay 75.

The movement of the control surface 141 is in a direction to reduce the pitch rate error. Displacement of the ram 137 is in such a direction that due to the displaced surface opposite pitch rate error may occur. As soon as this opposite pitch rate error has appreciable magnitude, the electronic relay 75 effects operation of the torquer 130 and displacement of control valve 132 in the opposite direction to give a displacement rate of the elevator surface in an opposite direction from that given initially.

For small error rate signals on conductor 65, the gain changer 150 of FIGURE 3A reduces the maximum voltage output from the limiter 78 so that the servo 119 operates at a lower rate for small error rate signals.

When desired or commanded pitch rate is introduced, switch 26 is moved to engage the rate contact and disengage the attitude rate contact 29. Selected pitch rate signals from potentiometer 34 are passed through the model 49 the output of which appears on conductor 60 and represents the desired pitch rate response of the craft. The actual pitch rate sensed by gyroscope 11 and after amplification appears on conductor 15 where it is summed at point 20 with the desired craft pitch rate signal. The error signal as modified by network 66 is utilized to control the hydraulic servo 119. If the actual pitch rate differs from the selected pitch rate on conductor 60 the relay 75 is operated to effect displacement of the elevator surface through servo 119 to equalize the two rates and reduce the error rate signal to zero with proper change by the limiter of the utilized output of the relay including automatic gain change of the limiter point of control.

For attitude stabilization, the vertical gyroscope 23 acts as an outer loop control and through potentiometer 24 introduces attitude condition control signals for operation of the elevator surface. Because of the high pass elevator feedback signals through network 146, the system operates as an integral controller and the desired altitude sensed by gyroscope 23 will be attained.

It will now be apparent that a novel condition control apparatus having substantially dynamical similar response at varying flight conditions has been provided which senses an error between the desired and actual condition change rate and through a non-linear controller of a discontinuous type operates condition changing means to attain a desired condition rate such as craft pitch rate and wherein the discontinuous control operation is modified so that for small error signals its average output is less than its maximum output. Furthermore provisions have been included in the apparatus to vary the maximum output of the controller thereby changing its gain whereby to limit the rate of operation of the condition changing means to reduce limit cycle oscillations amplitude of the craft about the desired condition change rate.

What is claimed is:

1. An adaptive discontinuous control apparatus for controlling a condition comprising: an operable condition change rate sensing first device; an operable selector second device for selecting a desired condition change rate; operation combining means responsive to said two devices; signal providing means responsive to the combining means and obtaining a derivative of the differential operation of said devices; a relay having approximately a square wave output voltage characteristic of positive or negative polarity dependent on the polarity of the signal applied thereto connected to said signal providing means; a limiter responsive to said relay and limiting the maximum effective usable output voltage of said relay; servo means operating a condition change rate device at an average rate dependent on the limiter output magnitude; and means controlling said servo means from said limiter whereby the average operation rate of the servo means is determined by said maximum effective output utilized.

2. The apparatus of claim 1, and a gain changer controlling said limiter and responsive to said combining means and reducing the effective maximum output of said limiter during small differences in operation of said first and second device.

3. The apparatus of claim 1 and further means jointly controlling said relay with said signal providing means and providing a characterized output of said relay to reduce the average output voltage therefrom for small differences in magnitudes of operation of said first and second devices.

4. The apparatus of claim 1; and a model interposed said selector and combining means having an output that is the desired response of the apparatus, whereby said combining means receives a modified input from the selector which is in accordance with the desired response of the condition control system.

5. The apparatus of claim 4, wherein the model has a response of a second order system.

6. In a pitch damper control apparatus for a dirigible craft having pitch attitude changing means and means limiting the maximum extent of operation of the attitude changing means from a normal position: a pitch attitude rate error sensing device responsive to the direction and rate of pitch attitude change; a relay having on-off characteristics controlled by the device so as to have substantially step electrical ouptuts of one polarity or another calling for maximum correction of an error in one or the other direction; limiting means connected to the relay to limit the magnitude of the electrical output utilized therefrom to opposie residual oscillation of the attitude changing means; and means including servo-means connected to the limiter and operating said attitude changing means, to provide an on-off disturbance damper with limited operation rates for said servo-means.

7. In control apparatus for a dirigible craft having attitude changing means and means limiting the maximum extent of operation of the attitude changing means from a normal position: sensing means providing an electrical quantity in accordance with the angular rate and angular acceleration of said craft; a relay having substantially on-off characteristics calling for maximum correction of an error in one or the other direction controlled by said sensing means so as to have substantially step electrical outputs of one polarity or another in accordance with the polarity of said electrical quantity; limiting means responsive to said relay and in turn providing a maximum limited on-off electrical output; and means including servo-means connected to said limiter and operating said attitude changing means, to provide for said craft an on-off disturbance damper with limited operation rates for said servo-means.

8. The apparatus of claim 6, a gain changing device connected to said limiter and varying the magnitude of the electrical output utilized; and connections from said rate sensing device to said gain changing device, to reduce the magnitude of the utilized electrical output at small attitude rate errors.

9. In condition control apparatus having condition changing means and means limiting the maximum extent of operation of the condition changing means from a normal position: condition error rate sensing means providing a variable electrical output of one polarity or another depending upon the direction of the change in condition and of a magnitude in accordance with the magnitude of condition change rate; an electronic relay having on-off characteristics controlled by the rate sensing device so as to have a substantially step electrical output of one polarity or another calling for maximum correction of said error in one direction or the other; a source of cyclically varying voltage having a maximum value exceeding the magiitude of the electrical output of said rate sensing device for small attitude error rates; and means including servo-means connected to said relay and operating said condition changing means said cyclic voltage serving to vary the operation of said servo-means for outputs of said rate sensing device smaller in magnitude than the maximum output of said cyclic means.

10. In control apparatus for a dirigible craft having attitude changing means and means limiting the maximum extent of operation of the attitude changing means from a normal position: in combinaiton, an attitude rate sensing device; a relay having on-off characteristics controlled by the device so as to have substantially a step electrical output of one polarity or another depending on the direction of the attitude rate; limiting means connected to the relay to limit the magnitude utilized of the step electrical output and additional means including servo-means connected to the limiter operating said attitude changing means, said additional means including a filter having a transfer function $$\frac{1+T_1S}{1-T_2S}$$

wherein $T_1$ is less than $T_2$, $T_1$ being a time constant of one portion of the filter, $T_2$ a time constant of another portion thereof, and S the La Place operator, whereby said limiter limits the operation rate of said servo-means.

11. In control apparatus for a dirigible craft having attitude changing means, in combination: control means providing a signal in accordance with craft attitude rate error and craft attitude acceleration; a relay having on-off output characteristics providing either of two fixed outputs alternatively, and controlled by said control means so as to have a discontinuous electrical output of one polarity or another depending on the polarity of the signal from the control means; limiting means connected to the relay to limit the maximum magnitude utilized of the fixed electrical output; servo-means connected to the limiter and operating said attitude changing means at a rate dependent on the magnitude of voltage output of said limiter; and further means operated by said servo-means to provide a follow-up electrical voltage in accordance with the rate of operation of the servo-means; and feedback means supplying said follow-up signal voltage to said servo-means, to provide an on-off disturbance damper with limited operating rates for said servo-means.

12. The apparatus of claim 11, and a gain changer adapted to adjust the limiting means to vary the maximum magnitude utilized of the electrical output; and means responsive to the attitude rate of said craft for operating said gain changer to decrease the maximum output utilized for small attitude rate error.

13. The apparatus of claim 11, a vertical gyro sensing craft attitude and providing a displacement signal; an analog model having a transfer function of a second order system responsive to said signal; and means connecting the output of said model to said relay for control thereof.

14. In adaptive multimode control apparatus for a dirigible craft having attitude changing means, in combination: a craft attitude displacement derivative sensing device; means operated by said device and developing a first signal in accordance with the magnitude of the craft attitude displacement derivative; manual means for providing a selected attitude displacement derivative second signal; an analog model responsive to said selected signal and providing an electrical output or third signal in accordance with the desired response of the combined apparatus and aircraft to said selected displacement derivative; means combining the electrical output of said model and said attitude displacement derivative signal and providing a resultant error signal; computing means for obtaining from said resultant signal a fourth signal in accordance with the attitude displacement derivative error and a further attitude displacement derivative; a nonlinear device responsive to said fourth signal and having a nonlinear or step output voltage limiter means connected to said nonlinear device and limiting the maximum voltage output utilized therefrom; servo-means operating the attitude changing means and having an input responsive to the output from said limiter; and follow-up means developing a fifth signal positioned by said servo-means and means connecting said follow-up means to said servo-means input, the influence of said non-linear means through said apparatus on said control system comprising the apparatus and aircraft being larger than the influence of changes in flight conditions of said craft on the natural frequency, damping or gain of said craft.

15. The apparatus of claim 14, wherein the non-linear controller is a relay having on-off characteristics whereby its output voltage is a discontinuous function of the input thereto; whereby its output voltage to said limiter is of discontinuous nonlinear character.

16. In self adaptive control apparatus for a dirigible craft having attitude changing means, servo-means operating said attitude changing means and pitch rate responsive means providing a first signal in accordance with the actual craft pitch rate, in combination: manual selective means providing a second signal in accordance with a selected craft pitch rate; an analog model having the response characteristics of said combined apparatus and craft and responsive to said second signal and having an output signal varying in accordance with said second signal; a device having a response equation of the second order; means combining said first and third signals and developing a fourth signal in accordance with the error rate and error acceleration of the craft relative to the model output; a discontinuous nonlinear controller responsive to said fourth signal and having fixed output or fifth voltage; a limiter responsive to said controller and developing a sixth voltage which is a limited maximum magnitude of said fifth voltage; servo means controlled by said sixth voltage; and feedback means operated by said servo-means and additionally controlling said servo-means, said limiter output determining the maximum operation rate of said servo-means.

17. In control apparatus for a dirigible craft having attitude changing means, in combination: a craft position change rate sensing device; a relay having on-off characteristics controlled by the device so as to have a substantially discontinuous fixed electrical outputs of one polarity or another dependent on the direction of the position rate; limiting means connected to the relay to reduce the magnitude of the fixed electrical relay output utilized; means including servo-means connected to the limiter and operating said attitude changing means at an average rate dependent on the output of the limiter; a gain changer modifying the magnitude of the electrical output transmitted by said limiter; and means responsive to a function of the position rate of the craft for adjusting said gain changer, to reduce the average operation rate of the servo means for small position rate errors.

18. The apparatus of claim 17, and means for supplying an additional voltage to said relay and cyclically varying in positive and negative magnitudes.

19. The apparatus of claim 18, and further means for varying the magnitude of the cyclic signal applied to said relay.

20. In condition control apparatus having condition changing means, in combination: a condition error sensing device; an electronic relay having substantially on-off or discontinuous characteristics controlled by the device so that for large condition errors there is substantially a fixed output irrespective of the magnitude of the error signal; limiting means connected to the output of the relay to reduce the magnitude of the fixed electrical output utilized; means including servo means connected to the limiter and operating said attitude changing means at an average rate dependent on the magnitude of output from the limiter; and further means also responsive to said error signal and connected to said limiter whereby for small error signals, the maximum electrical output from said limiter is decreased to reduce the average operation rate of the servo means.

21. Control apparatus for an aircraft having attitude changing means, comprising: an analog model having an output that is desired of the system response of said apparatus-aircraft combination; condition sensing means responsive to the actual output of said apparatus-aircraft combination; selective means applying a control input to said model; a trim signal source; signal responsive summing means connected to an output of said analog model, to an output of said condition sensing means and to an output of said trim signal source; and means including on-off switching means having an output in accordance with the output of the signal responsive means reversibly operating said attitude changing means and controlled by said signal responsive summing means, said trim signal source compensating for steady state error outputs from said analog model.

22. Control apparatus for an aircraft having attitude changing means, comprising: an analog model having an output that is the desired system response of said apparatus-aircraft combination: condition sensing means responsive to the actual output of said apparatus-aircraft combination; selective means applying a control input to said model; summing means connected to an output of said analog model and to an output of said condition sensing means; said summing means providing the difference between the output of the model and the output of the condition sensing means; computing means responsive to said difference and supplying an output comprising a combination of said difference and a derivative of said difference; relay means responsive to the output of said computing means and having a nonlinear or an on-off output of a fixed amount tending to reduce said difference; limiting means reducing the output of said relay means by limiting the fixed output thereof; and servo means operating said attitude changing means at an average rate depending on the magnitude of control applied thereto and responsive to the fixed output of said limiter.

23. The apparatus of claim 22, and gain changing means also responsive to said summing means and connected to said limiter to reduce the fixed output of said limiter derived from the relay means in accordance with the magnitude of said difference, to reduce the average operation rate of the servo-means as said difference decreases, to reduce the magnitude of chatter in said system.

24. The apparatus of claim 22, and further means providing a cyclic varying output and connected to said relay means, the magnitude of an output of said cyclic means exceeding the magnitude of small values of said difference to provide continuous rather than nonlinear or on-off control of the servo means for small difference magnitude.

25. The apparatus of claim 22, and feedback means operated by said servo means and supply to said servo means a signal dependent on the rate of operation of the servo means.

26. Apparatus for minimizing mechanical vibrations of an aircraft in flight said aircraft having attitude changing means responsive to motor means controlled by a relay means the relay means including a craft condition sensing device said relay means having a substantially square wave output, said apparatus comprising: limiter means applying the output of the relay to said motor means; and further means responsive to said mechanical vibrations within a certain band of frequencies and controlling said limiter to reduce the magnitude of the output of the relay applied to said motor means.

27. Control apparatus for an aircraft having attitude changing means, comprising: an analog model having an output that is the desired system response of said apparatus-aircraft combination; condition sensing means responsive to the actual output of said apparatus-aircraft combination; selective means applying a control input to said model; signal responsive summing means connected to an output of said analog model and to an output of said condition sensing means; and means including on-off switching means having positive or negative outputs in accordance with the output of the signal responsive means reversibly operating said attitude changing means and controlled by said signal responsive summing means.

28. Control apparatus for an aircraft having attitude changing means, comprising: an analog model having an output that is the desired system response of said apparatus-aircraft combination; condition sensing means responsive to the actual output of said apparatus-aircraft combination; selective means applying a control input to said model; summing means connected to an output of said analog model and to an output of said condition sensing means, said summing means providing the difference between the output of the model and the output of the condition sensing means; computing means responsive to said difference and supplying an output comprising a combination of said difference and a derivative of said difference; relay means responsive to the output of said computing means and having a non-linear or an on-off output of a fixed amount tending to reduce said difference; and servo means operating said attitude changing means at an average rate depending on the magnitude of control applied thereto and responsive to the output of said computing means.

29. In control apparatus for a dirigible craft having attitude changing means: an attitude rate sensing D.C. electrical signal providing device responsive to the direction and rate of attitude change from a desired attitude; electrical signal responsive means having on-off characteristics for large signals controlled by the device so as to have substantially step electrical outputs of one polarity or another calling for maximum attitude correction in one or the other direction; means including servo means connected to said relay and operating said attitude changing means to restore said craft to said desired attitude and means in said responsive means providing an oscillating output for zero rate signals.

30. An adaptive discontinuous control apparatus for controlling a condition comprising: an operable condition change rate sensing first device; an operable selector second device for selecting a desired condition change rate; operation combining means responsive to said two devices; signal providing means responsive to the combining means and obtaining a derivative of the differential operation of said devices; means connected to said signal providing means for generating a voltage of fixed magnitude and positive or negative polarity dependent upon the polarity of the signal from said signal providing means; and means including servo means connected to said generating means for operating a condition change rate device for equalizing said desired and sensed change rates.

31. A control system for a craft having a control surface for changing the attitude thereof, comprising: means for producing a first attitude-change rate signal; an analog model connected to said first signal producing means and operable responsive to said first signal to produce a second signal corresponding to the desired craft response to said first signal; means for sensing craft response and producing a third signal corresponding thereto; means connected to said second and third signal producing means for producing a fourth signal corresponding to the error between said second and third signals; means connected to said fourth signal producing means and controlled by said fourth signal to produce a fifth signal proportional to said fourth signal and the rate of change of said fourth signal; control means connected to said fifth signal producing means and operative responsive to said fifth signal to produce a sixth signal of fixed magnitude and of preponderant polarity in accordance with the polarity of said fifth signal; and means including servo means controllably connected to said control means and operative responsive to said sixth signal to operate said control surface and thereby change said craft attitude to minimize said error.

32. Control apparatus for an aircraft having attitude changing means, comprising: an analog model having an output that is the desired system response of said apparatus-aircraft combination; condition sensing means responsive to the actual output of said apparatus-aircraft combination; selective means applying a control input to said model; summing means connected to an output of said analog model and to an output of said condition sensing means, said summing means providing the difference between the output of the model and the output of the condition sensing means; computing means responsive to said difference and supplying an output comprising a combination of said difference and a derivative of said difference; relay means responsive to the output of said computing means and having a non-linear or an on-off output of a fixed amount tending to reduce said difference; and servo means operating said attitude changing means at an average rate depending on the magnitude of control applied thereto and responsive to the output of said computing means.

33. Control apparatus for an aircraft having attitude changing means, comprising: an analog model having an output that is the desired system response of said apparatus-aircraft combination; condition sensing means responsive to the actual output of said apparatus-aircraft combination; selective means applying a control input to said model; signal responsive summing means connected to an output of said analog model and to an output of said condition sensing means; and means including on-off switching means providing an output of one or another sign in accordance with the output of the signal responsive means reversibly operating said attitude changing means and controlled by said signal responsive summing means.

34. An adaptive discontinuous control apparatus for controlling a condition comprising: an operable condition change rate sensing first device; an operable selector second device for selecting a desired condition change rate; operation combining means responsive to said two devices; signal providing means responsive to the combining means and obtaining a derivative of the differential operation of said devices; means connected to said signal providing means for generating a voltage of fixed magnitude and positive or negative polarity dependent upon the polarity of the signal from said signal providing means; and means including servo means connected to said generating means for operating a condition change rate device for equalizing said desired and sensed change rates.

35. In control apparatus for a dirigible craft having attitude changing means; an attitude rate sensing device responsive to the direction and rate of attitude change from a desired attitude; a relay having on-off characteristics controlled by the device so as to have substantially step electrical outputs of one polarity or another calling for maximum attitude correction in one or the other direction; means including servo means connected to said relay and operating said attitude changing means to restore said craft to said desired attitude and further means responsive to the oscillation frequency of said servo means altering the magnitude of said electrical outputs.

36. A control system for a craft having a control surface for changing the attitude thereof, comprising: means for producing a first attitude-change rate signal; an analog model connected to said first signal producing means and operable responsive to said first signal to produce a second signal corresponding to the desired craft response to said first signal; means for sensing craft response and producing a third signal corresponding thereto; means connected to said second and third signal producing means for producing a fourth signal corresponding to the error between said second and third signals; means connected to said fourth signal producing means and controlled by said fourth signal to produce a fifth signal proportional to said fourth signal and the rate of change of said fourth signal; control means connected to said fifth signal producing means and operative responsive to said fifth signal to produce a sixth signal of fixed magnitude and of preponderant polarity in accordance with the polarity of said fifth signal; and means including servo means controllably connected to said control means and operative responsive to said sixth signal to operate said control surface and thereby change said craft attitude to minimize said error.

37. Control apparatus for an aircraft having attitude changing means, comprising: an analog model having an output that is the desired system response of said apparatus-aircraft combination; condition sensing means responsive to the actual output of said apparatus-aircraft combination; selective means applying a control input to said model; summing means connected to an output of said analog model and to an output of said condition sensing means, said summing means providing the difference between the output of the model and the output of the condition sensing means; computing means responsive to said difference and supplying an output comprising a combination of said difference and a derivative of said difference; relay means responsive to the output of said computing means and having a non-linear or an on-off output of a fixed amount tending to reduce said difference; and servo means operating said attitude changing means at an average rate depending on the magnitude of control applied thereto and responsive to the output of said computing means.

38. Control apparatus for an aircraft having attitude changing means, comprising: an analog model having an output that is the desired system response of said apparatus-aircraft combination; condition sensing means responsive to the actual output of said apparatus-aircraft combination; selective means applying a control input to said model; signal responsive summing means connected to an output of said analog model and to an output of said condition sensing means; and means including on-off switching means providing an output of one type or the opposite in accordance with the output of the signal responsive means reversibly operating said attitude changing means and controlled by said signal responsive summing means.

39. An adaptive discontinuous control apparatus for controlling a condition comprising: an operable condition change rate sensing first device; an operable selector second device for selecting a desired condition change rate; operation combining means responsive to said two devices; signal providing means responsive to the combining means and obtaining a derivative of the differential operation of said devices; means connected to said signal providing means for generating a voltage of fixed magnitude and positive or negative polarity dependent upon the polarity of the signal from said signal providing means; and means including servo means connected to said generating means for operating a condition change rate device for equalizing said desired and sensed change rates.

40. In control apparatus for a dirigible craft having attitude changing means; an attitude rate sensing device responsive to the direction and rate of attitude change from a desired attitude; a relay having on-off characteristics controlled by the device so as to have substantially step electrical outputs of one polarity or another calling for maximum attitude correction in one or the other direction; means including servo means connected to said relay and operating said attitude changing means to restore said craft to said desired attitude and further means controlled by said rate sensing device modifying the electrical output of said relay.

41. In control apparatus for a dirigible craft having attitude changing means, in combination: an attitude rate sensing device; a relay having on-off characteristics controlled by the device so as to have substantially a step electrical output of one polarity or another depending on the direction of the attitude rate; limiting means connected to the relay to limit the magnitude utilized of the step electrical output; additional means including servo means connected to the limiter and controlled thereby and operating said attitude changing means; further means connected to the limiting means and varying the output comprising, a band pass filter passing selected voltage frequencies, means responsive to oscillations of said craft for supplying voltage signals to said filter, means converting such selected voltages from said filter to a direct voltage, means supplying a selected fixed voltage, and means integrating the difference of the selected fixed voltage and the converted D.C. voltage and controlling said limiter to vary the electrical output.

42. In flight control apparatus for a dirigible craft having attitude changing means, in combination: a flight condition sensing device; means including a relay having on-off characteristics controlled by the device so as to have substantially a step electrical output of one polarity or another depending on the direction of the attitude rate; limiting means in said first means connected to the relay to limit the magnitude of the step electrical output; additional means including servo means connected to the first means and controlled thereby and operating such attitude changing means; further means connected to the first means and varying the output comprising, a band pass filter passing selected voltage frequencies, means responsive to oscillation involved in the control of said craft for supplying voltage signals to said filter, means converting such selected voltages from said filter to a direct voltage, means supplying a selected fixed voltage, and means integrating the difference of the selected fixed voltage and the converted D.C. voltage and controlling said limiter to vary the electrical output.

43. Control apparatus for an aircraft having attitude changing means, comprising: an analog model having an output that is the desired system response of said apparatus-aircraft combination; flight condition sensing means responsive to the actual output of said apparatus-aircraft combination; selected means supplying a control input signal to said model; summing means connected to an output of said analog model and to an output of said flight condition sensing means, said summing means providing the difference between the output of the model and the output of the flight condition sensing means; amplifier means responsive to the output of said summing means and having a non-linear or an on-off output of a fixed amount; limiting means reducing the output of said amplifier means; servo means operating said attitude changing means at an average rate depending on the magnitude of control applied thereto and responsive to the output of said limiter; and additional means controlling the output of said limiter including, a band-pass filter passing selected voltage frequencies, means controlled by such selected voltage and converting it to a direct voltage, means supplying a selected fixed voltage, means integrating the difference of said converter-selected fixed voltages and connected to said limiter.

44. In flight attitude control apparatus for a dirigible craft having attitude changing means, in combination: an attitude rate error sensing device responsive to the direction and rate of attitude change; a first means having an output of an on-off character so as to have a substantially step electrical outputs of one polarity or another calling for maximum correction of an error in one or the other direction if the magnitude of the angular rate exceeds a predetermined magnitude and controlled by said error sensing device; and further means in said first means providing an output continuously varying for angular rates below said predetermined magnitude; limiter means connected to the first means to limit the magnitude of the electrical output utilized therefrom; and means including servo means connected to the limiter and controlled therefrom and operating said attitude changing means, for damping transient attitude disturbances of said craft.

45. The apparatus of claim 44, wherein the output from said first means during its continuous variation for the magnitude of the input consists of alternate positive and negative square waves and wherein the width of one half wave exceeds that of the other and the average output varies with the sum thereof.

46. In flight attitude control apparatus for a dirigible craft having attitude changing means, in combination: an attitude rate error sensing device responsive to the direction and rate of attitude change; a first means having an output of an on-off characteristic controlled by said device so as to have substantially step electrical outputs of one polarity or another calling for maximum correction of an error in one or the other direction for rates exceeding a predetermined magnitude, said first means having an output continuously varying with the input for angular rates below said predetermined magnitude sensed by said device; and means including servo means connected to the first means and operating said attitude changing means.

*47. In an automatic pilot for aircraft, apparatus for minimizing the amplitude of mechanical vibrations of an aircraft in flight subject to various flight conditions of altitude and airspeed, said aircraft having attitude changing means operated by motor means, electronic amplifier means, the amplifier means including a craft flight condition sensing device; means applying the output of the amplifier means to said motor means; and further means transmitting mechanical vibrations within a certain band of frequencies controlling the magnitude of the output of the amplifier means applied to said motor means.*

*48. Apparatus for minimizing mechanical vibrations of an aircraft in flight said aircraft having attitude changing means responsive to motor means controlled by an amplifier means the amplifier means including a craft flight condition signal providing sensing device; gain changing means varying the amount of control applied to the motor means by said amplifier means for any normal magnitude of signal said gain changing means comprising filter means responsive to the frequency and magnitude of amplitude of said mechanical vibrations providing one quantity, selective means providing a selected magnitude quantity, an integrator controlled by the difference of the two quantities whereby said integrator varies the magnitude of control from the amplifier means applied to the motor means.*

*49. In a control apparatus for a dirigible craft having attitude changing means in combination: craft rate responsive means; amplifier means controlled by the rate responsive means; servo means positioning said attitude changing means and controlled by the amplifier means; adjustable means varying the magnitude of control of the servo means by the amplifier means; and means controlling the adjustable means comprising, a band-pass filter transmitting selected voltage frequencies, craft oscillation responsive means supplying voltage signals to said filter, means converting the selected filtered voltage to an absolute direct voltage which is independent of the phase of the transmitted voltage, additional means supplying a selected fixed direct voltage, and integrating means controlled by the difference of the absolute voltage and selected fixed direct voltages operating the adjustable means.*

*50. In control apparatus for an aircraft having attitude changing means, in combination: flight condition responsive means on said craft; amplifier means controlled by the flight condition responsive means; servo means positioning said attitude changing means and controlled by the amplifier means; adjustable means modifying the control of the servo means by the amplifier means as derived from the flight condition responsive means; further means controlling the adjustable means comprising, a frequency band-pass filter passing selected voltage frequencies, oscillation responsive means supplying voltage signals to said filter, means converting the selected filtered voltage to an absolute direct voltage and independent of the phase of the filtered frequency voltage, additional means supplying a selected fixed direct voltage, and integrating means jointly controlled by the absolute voltage and selected fixed direct voltages operating the adjustable means.*

*51. In flight control apparatus for a dirigible craft having attitude changing means, in combination: a flight condition sensing voltage producing device; amplifier means controlled by the voltage from said sensing device and supplying an electrical output; adjustable means connected to the amplifier means to vary the electrical output of the amplifier means for any voltage supplied to the amplifier means from the sensing device; servo means connected to the amplifier means and controlled thereby and operating said attitude changing means; further means connected to the adjustable means for varying the electrical output of the amplifier means comprising, a band-pass filter passing selected voltage frequencies, means responsive to oscillation involved in the control of the craft for supplying A.C. voltage signals to said filter; means converting such selected voltages from said filter to a direct voltage, means supplying a selected fixed voltage, and means integrating the difference of the selected fixed voltage and the converted A.C. voltage and controlling said adjustable means to vary the amplifier means electrical output.*

*52. In flight control apparatus for a dirigible craft having attitude changing means, in combination: a flight condition sensing device; amplifier means controlled by the sensing device and providing an electrical output; gain changing means in said amplifier means connected to vary the magnitude of the electrical output; additional means including servo means connected to the amplifier means and controlled thereby and operating the attitude changing means; further means connected to the gain changing means for varying the output comprising, a band-pass filter passing selected voltage frequencies, means responsive to oscillation involved in the control of said craft for supplying voltage signals to said filter, rectifier means converting such selected voltages from said filter to an absolute direct voltage, means supplying a selected fixed voltage, and means integrating the difference of the selected fixed voltage and the absolute direct voltage and controlling said gain changing means to vary the output of the amplifier means.*

*53. Control apparatus for an aircraft having attitude changing means, comprising: an analog model having an output that is a desired system response of said apparatus-aircraft combination; flight condition sensing means responsive to the actual output of said apparatus-aircraft combination; selected means supplying a control input signal to said model; summing means connected to an output of said analog model and to an output of said flight condition sensing means, said summing means providing the difference between the output of the model and the output of the flight condition sensing means; amplifier means responsive to the output of said summing means; gain changing means varying the output of said amplifier means independent of the output of said summing means; servo means operating said attitude changing means and responsive to the amplifier means; and additional means controlling said gain changing means including, a band-pass filter passing selected voltage frequencies, means controlled by such selected voltages and converting a transmitted voltage to a direct voltage, means supplying a selected fixed voltage, and means integrating the difference of said converter and selected fixed voltages and adjusting said gain changing means.*

*54. Control apparatus for an aircraft having attitude changing means comprising: an analog model having an output that is the desired response of said aircraft; craft angular rate sensing means responsive to the craft angular rate; selected means supplying a control input signal to said model; summing means connected to an output of said analog model and to an output of said angular rate sensing means, said summing means providing the difference between the output of the model and the output of the angular rate sensing means; amplifier means responsive to the output of said summing means; limiting*

*means varying the output of said amplifier means; servo means operating said attitude changing means in accordance with the output of amplifier means; and additional means controlling said limiter including, a band-pass filter passing selected voltage frequency, means controlled by such selected voltage and converting it to a direct voltage, means supplying a selected fixed voltage, means integrating the difference of said converter-selected fixed voltages and connected to said limiter for adjustment thereof.*

References Cited in the file of this patent or the original patent

UNITED STATES PATENTS

| | | |
|---|---|---|
| 2,298,657 | Smith et al. | Oct. 13, 1942 |
| 2,808,999 | Chenery | Oct. 8, 1957 |
| 2,823,275 | Ault | Feb. 11, 1958 |
| 2,862,167 | Curry | Nov. 25, 1958 |
| 2,869,804 | Muinch et al. | Jan. 20, 1959 |

FOREIGN PATENTS

| | | |
|---|---|---|
| 1,162,426 | France | Apr. 8, 1958 |